(12) United States Patent
Haugsnes (10) Patent No.: US 8,590,014 B1
(45) Date of Patent: Nov. 19, 2013

(54) NETWORK APPLICATION SECURITY UTILIZING NETWORK-PROVIDED IDENTITIES

(75) Inventor: Andreas Seip Haugsnes, Mountain View, CA (US)

(73) Assignee: Zynga Inc., San Francisco, CA (US)

( * ) Notice: Subject to any disclaimer, the term of this patent is extended or adjusted under 35 U.S.C. 154(b) by 552 days.

(21) Appl. No.: 12/880,723

(22) Filed: Sep. 13, 2010

(51) Int. Cl.
*H04L 29/06* (2006.01)

(52) U.S. Cl.
USPC .............................................................. 726/3

(58) Field of Classification Search
USPC .............................................................. 726/3
See application file for complete search history.

(56) References Cited

U.S. PATENT DOCUMENTS

| 8,359,637 B2 * | 1/2013 | Yau et al. ........................... 726/4 |
| 8,375,429 B2 * | 2/2013 | Mondal .............................. 726/8 |
| 2009/0292814 A1 * | 11/2009 | Ting et al. ....................... 709/229 |

* cited by examiner

*Primary Examiner* — Michael S McNally
(74) *Attorney, Agent, or Firm* — Martine Penilla Group, LLP (57) ABSTRACT

A network security system that correlates security-related events to individual users, as identified by a user identifier and an identity provider. The user identifier may be associated in one or more implicit or explicit social networks.

17 Claims, 4 Drawing Sheets

NETWORK APPLICATION SECURITY UTILIZING NETWORK-PROVIDED IDENTITIES

FIELD OF THE INVENTION

The present disclosure generally relates to network security and, in particular, to network security systems that consider authenticated, network-provided user identities.

BACKGROUND

An Intrusion Detection System (IDS) is a device or software application that monitors network and/or system activities for malicious activities or policy violations and produces reports to a management station. Intrusion prevention is the process of performing intrusion detection and attempting to stop detected possible incidents. Intrusion detection and prevention systems (IDPS) are primarily focused on identifying possible incidents, logging information about them, attempting to stop them, and reporting them to security administrators. In addition, organizations use IDPSs for other purposes, such as identifying problems with security policies, documenting existing threats, and deterring individuals from violating security policies. IDPSs typically record information related to observed events, notify security administrators of important observed events, and produce reports. Many IDPSs can also respond to a detected threat by attempting to prevent it from succeeding. They use several response techniques, which involve the IDPS stopping the attack itself, changing the security environment (e.g., reconfiguring a firewall), or changing the attack's content.

Users of various network services, such as email, social networking systems, and the like, typically maintain accounts with such systems that are keyed to a user identifier. Some of these network service providers, such as Yahoo, Facebook, and Google, act as an identity provider to other third party systems. For example, OpenID is an open standard that describes how users can be authenticated in a decentralized manner, obviating the need for services to provide their own ad hoc systems and allowing users to consolidate their digital identities. The OpenID protocol does not rely on a central authority to authenticate a user's identity. The term OpenID may also refer to an ID as specified in the OpenID standard; these IDs take the form of a unique URL, and are managed by some 'OpenID provider' that handles authentication. A so-called relying party may use the OpenID protocol to authenticate the identity of a user relative to a so-called OpenID Provider. Open Authentication (OAuth) is another standard for transferring and exchanging user credentials. The OAuth endpoints are configured with pre-shared keys between one or many providers (for example Yahoo, Google) with the consumer (ref 'Application to be secured'). Like OpenID, OAuth uses a unique URL to validate the user and grant access between the consumer and provider.

SUMMARY

The present invention provides methods, apparatuses and systems directed to a network security system that correlates security-related events to individual users, as identified by a user identifier and an identity provider. The user identifier may be associated in one or more implicit or explicit social networks. Correlating events to users, as opposed to remote hosts identified by a network address, greatly expands the data that can be gathered, associated and correlated thereby improving the ability to develop more sophisticated attack signatures.

These and other features, aspects, and advantages of the disclosure are described in more detail below in the detailed description and in conjunction with the following figures.

DESCRIPTION OF EXAMPLE EMBODIMENT(S)

Figure 1:
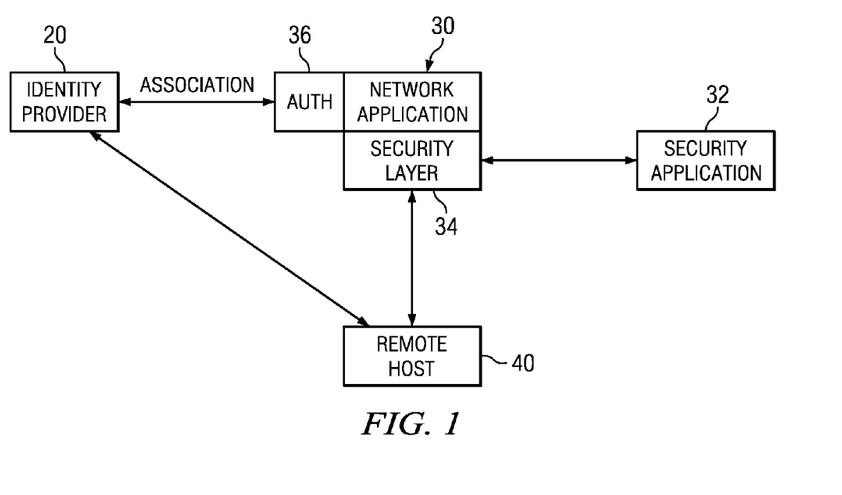
FIG. 1 is a schematic diagram illustrating an example security framework.

FIG. 1 is a schematic diagram illustrating various systems and elements in an example network environment, in which implementations of the invention may operate. An identity provider 20 is a network addressable system that hosts an application that authenticates users and verifies user identities to one or more relying systems. An identity provider 20 may host other applications, such as email or other messaging applications, a web site, a social network and the like. In one implementation, the identity provider 20 is an OpenID or OAuth Provider according to the OpenID and or OAuth protocols. Other open authentication protocols can be used. Remote host 40 is an end system associated with an individual user. Remote host 40 may include one or more client applications, such as network browsers, that access one or more network applications, such as the network application hosted by network application system 30. Network application system 30 is a network addressable system that hosts one or more network applications. The network applications may include, but are not limited to, electronic payment systems, games, productivity applications, and informational websites, as well as any combination of the foregoing. Security application system 32 hosts a security application that is described in more detail below. Network application system 30 may include security layer 34 and authentication module 36. Security layer 34 operates, as described below, to intercept, filter, block, log and/or report events associated with, messages transmitted between remote host 40 and network application 30. Authentication module 36 is operative to interact with identity provider 20 to authenticate sessions and validate asserted user identities associated with identity provider 20. Although FIG. 1 illustrates a single identity provider 20, implementations of the invention can operate with multiple identity providers.

Network application system 30 may maintain a plurality of user accounts in connection with a network application, such as a game. The identity of the users associated with the accounts are tied to the identities maintained at one or more identity providers 20, as described in more detail below.

OpenID Authentication Workflow

Typically, an end user at remote host 40 initiates authentication by presenting a user identifier to network application 30 via a browser or other user agent. Authentication module

36 establishes the OP Endpoint URL that the end user uses for authentication. The authentication module 36 and the identity provider 20 establish an association—a shared secret established using Diffie-Hellman Key Exchange (Rescorla, E., "Diffie-Hellman Key Agreement Method," [RFC2631]. The identity provider 20 uses an association to sign subsequent messages and the authentication module 36 to verify those messages. The network application 30 redirects the browser of the remote host 40 to the identity provider 20 with an OpenID Authentication request. The identity provider 20 typically authenticates the user by requesting a username and password. Upon successful authentication, the identity provider 20 redirects the browser of the remote host 20 back to the network application system 30 with an assertion that the user has been authenticated. This assertion includes a digital signature generated with the shared key. The authentication module 36 of the network application system 30 verifies the information received from the identity provider 20 including verifying the signature by using either the shared key established during the association or by sending a direct request to the identity provider 20. In one implementation, the security framework described below attributes authenticated messages, such as HTTP requests, to the users identified in the requests in order to correlate security-related events to users for enhanced attack analysis and signature generation.

As discussed above, either identity provider 20 or another system may provide one or more services that users access, using their respective identities, to perform various tasks. For example, the identity provider 20 may host an email service that allows users to send and receive email to other users. The identity provider 20 may host an instant messaging, Voice-over-IP (VoIP) or chat service that allow users to interact in real-time. The identity provider may also host a web site for shopping and the like, or a social networking service. All such services, either explicitly or implicitly, establish various associations or connections between users. For example, a social networking system may maintain a social graph that models explicitly formed connections between users. An email service provider may monitor email addresses or contact databases of users to establish similar social graphs. In addition, third party systems may aggregate and analyze data to provide a database of social graph data based on communications between users. As such, the user identifiers and their implicit and explicit connections and associations establishes a form of social identity that can be relied on for enhanced security operations described herein.

OAuth Authentication Workflow [RFC5849]

The OAuth protocol enables delegated access to protected resources. The OAuth protocol was stabilized at version 1.0 in October 2007, and revised in June 2009 (Revision A) as published at <oauth.net/core/1.0a>. In the traditional client-server authentication model, the client uses its credentials to access its resources hosted by the server. With the increasing use of distributed web services and cloud computing, third-party applications require access to these server-hosted resources. OAuth introduces a third role to the traditional client-server authentication model: the resource owner. In the OAuth model, the client (which is not the resource owner, but is acting on its behalf) requests access to resources controlled by the resource owner, but hosted by the server. In addition, OAuth allows the server to verify not only the resource owner authorization, but also the identity of the client making the request. OAuth provides a method for clients to access server resources on behalf of a resource owner (such as a different client or an end-user). It also provides a process for end-users to authorize third-party access to their server resources without sharing their credentials (typically, a username and password pair), using user-agent redirections. For example, a web user (resource owner) can grant a printing service (client) access to her private photos stored at a photo sharing service (server), without sharing her username and password with the printing service. Instead, she authenticates directly with the photo sharing service which issues the printing service delegation-specific credentials.

In order for the client to access resources, it first has to obtain permission from the resource owner. This permission is expressed in the form of a token and matching shared-secret. The purpose of the token is to make it unnecessary for the resource owner to share its credentials with the client. Unlike the resource owner credentials, tokens can be issued with a restricted scope and limited lifetime, and revoked independently. This specification consists of two parts. The first part defines a redirection-based user-agent process for end-users to authorize client access to their resources, by authenticating directly with the server and provisioning tokens to the client for use with the authentication method. The second part defines a method for making authenticated HTTP [RFC2616] requests using two sets of credentials, one identifying the client making the request, and a second identifying the resource owner on whose behalf the request is being made.

Security Framework

Figure 2:
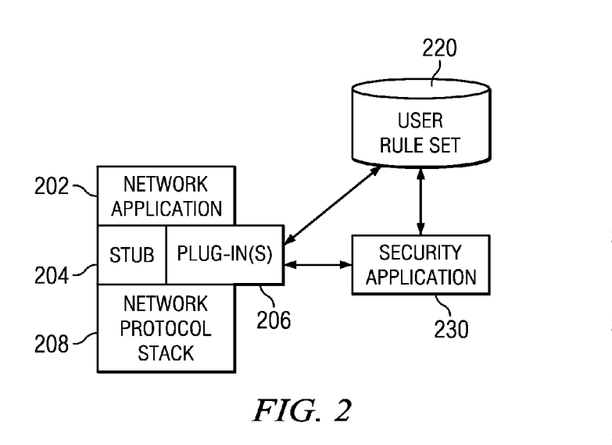
FIG. 2 is a schematic diagram illustrating an example system architecture.
Figure 7:
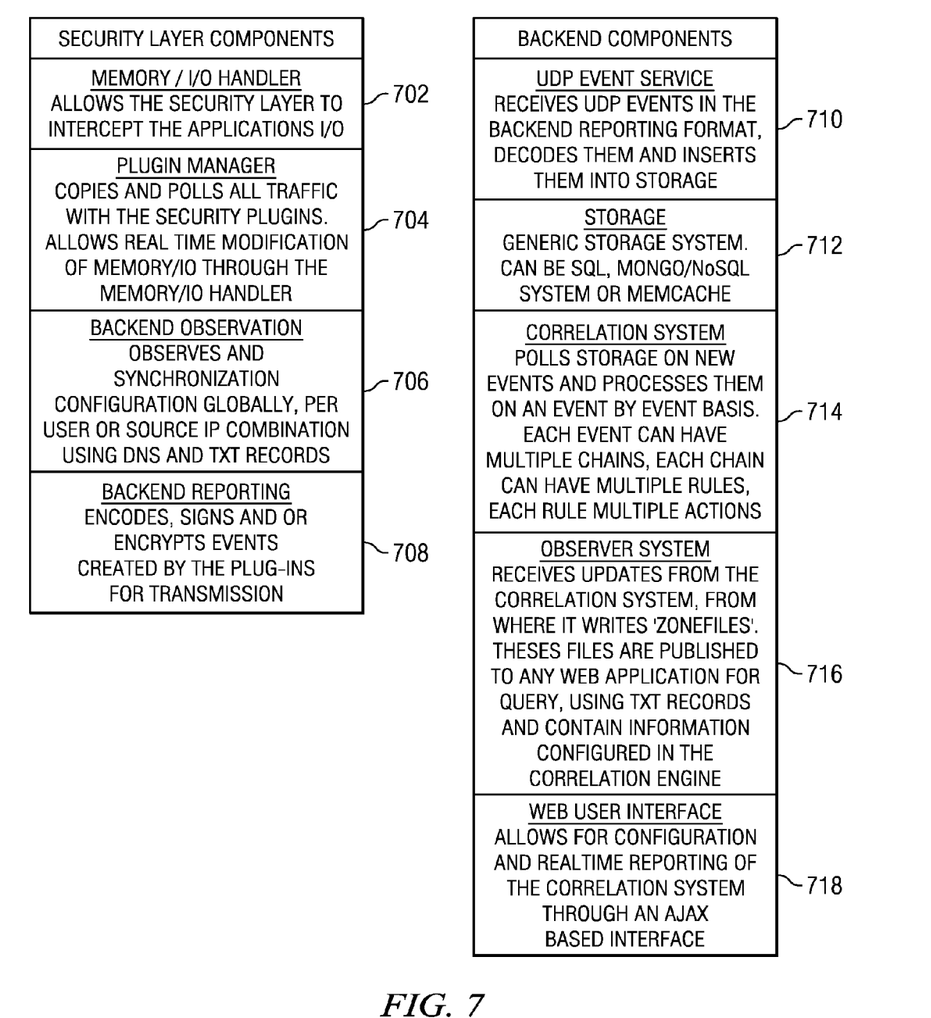
FIG. 7 is a schematic illustrating various components of the security framework.

FIGS. 2 and 7 illustrate an example security system architecture in more detail. The security framework is a threat correlation framework that operates in connection with explicit and/or implicit social networks and can operate in connection with one to a plurality of different network applications, such as different games, productive applications or other network applications. A use of the security framework, described herein, is to actively detect, correlate and prevent threats (such as impactful users, automated systems or other types of attacks). The security framework can be applied across a series of network applications, written in the same or different languages in the application layer, towards the application that it is integrated with. The framework can broken into the following components: a frontend framework, a backend server framework, a backend correlation system, and a rule set configuration system. In one implementation, a security layer comprising stub 204 and one or more plug-ins 206 intercepts messages, such as HTTP requests, between a network application 202 and network protocol stack 208. Stub 204, plug-ins 206, network application 202 and network protocol stack 208, in one implementation, are embodied in computer program code hosted on a physical computing device, such as a server. Similarly, security application 230 can be implemented as a set of program code modules hosted on a physical computing device.

As FIG. 7 illustrates, the front end framework may include one or more of the following components: Memory/IO Handler 702: Allows the Security Layer to intercept the applications I/O; Plugin Manager 704: Copies and polls all traffic with the Security Plugins, and allows real time modification of Memory/IO through the Memory/IO Handler 702; Backend Observation 706: Observes and synchronizes configuration globally, per user or source IP combination using DNS and TXT records; and Backend Reporting 708: Encodes, signs and or encrypts events created by the plug-ins for transmission.

The frontend framework, implemented by the stub 204 and plug-ins 206, can be created in a pluggable way, allowing for several engines to run at the same time. In one implementation, the stub 204 and plug-ins 206 are a library accessed by network application 202 for various security functions. Each engine or plug-in 206 can perform a separate security-related task, such as: checking if the user is a computer versus a real person ("botter"), determining whether the user is sending malicious traffic ("Intrusion Detection"), or implementing proprietary business logic such as "This user has been in this city/game for more than 10 hours." For example, the plug-ins 206 can be configured to detect cross-site scripting attacks, SQL injection, internet bots, DoS attacks, and other attacks. The plug-in engines 206 may filter messages and send messages to the backend framework via API calls. The general API function calls are mapped into the shared component referred to as the dataFormat, described as follows:

> string $input["engine"]: Defines the name of the engine.
> string $input["action"]: Recommends an action back to the application upon detection, i.e. "block" or "alert".
> string $input["threat"]: Threat Category, in example "sql injection" or "xss"
> integer $input["rating"]: Business Impact (Number/Integer, 0 is lowest, 4 is highest)
> string $input["description"]: Human Readable Description
> array $input["payload"]: Extra information about the data This data can be JSON-encoded, encrypted with AES (optional), and signed with a Hash-based Message Authentication Code (HMAC). The data may transported to the backend framework in User Datagram Protocol (UDP) packets for further analysis.

The backend framework, implemented by security application 230, receives UDP Packets from several network applications 202 running the frontend framework. As FIG. 7 illustrates, the backend framework may include one or more of the following components: UDP Event Service 710: Receives UDP Events in the Backend Reporting Format, decodes them and inserts them into Storage; Storage 712: A generic storage system (e.g., SQL, Mongo/NoSQL system or Memcache); Correlation System 714: Polls storage on new events and processes them on an event by event basis; Observer System 716: Receives updates from the Correlation system, from where it writes 'zonefiles'—these files are published to any Web Application for query, using TXT records and contain information configured in the correlation engine; and Web User Interface 718: Allows for configuration and real-time reporting of the correlation system through an AJAX based interface.

The security application may decrypt the packets (if encrypted), verify the HMAC, and insert the data into a message queue. After inserting the data into a temporary message queue, all data messages are indexed by the following fields:

> Engine—The source engine that detected a threat towards the enterprise;
> Source IP—The Source IP address involved in the threat (ref: attacker);
> Source Port—The Source Port involved in the threat (ref: attacker);
> Target IP—The Target IP address involved in the threat (ref: webserver);
> Target Port—The Target Port involved in the threat (ref: webserver);
> Network ID—Integer Value of the Identity Provider Network (i.e. 1 for facebook, 2 for myspace, 3 for yahoo, etc.);
> Social Network UID—Integer or String Value of the User ID (12345678, or john@doe.com, depending on Identity Provider Network);
> Threat—Type of threat (In example: "sql injection","xss"); and
> Rating—Integer, 0-4 (0 is lowest, 4 is highest based on business impact). The backend correlation system, implemented by security application 230, accessing the indexed fields of the backend frame and using a meta-programming language (e.g., slimmed down conditional statements—"IF", "OR", "AND", "COUNT", "GROUP") can be configured to create dynamic chains of statements to evaluate if a specific threat is happening towards the business.

Examples of automated questions [that can be asked individually, or as a longer chain]:

> Is anyone attacking Game A using SQL Injection?
> And XSS?
> Is anyone attacking Game A, and any other games, using SQL Injection and XSS?
> Has this person attacked any games in the past 2 weeks?
> Is he also a botter?

These questions are intended to show how the power of the chains are incremental, starting with the simplest question and going beyond. The chains essentially let each application that has implemented the frontend framework share statistics and data, creating conditional statements that narrow down business threats. The correlation of various events to users (relative to user identifier and identity provider pairs) allows for assessment of behaviors across multiple network applications (associated with the same or different domains) and remote hosts. In addition, correlating events to users also allows for various enhancements. For example, the correlation framework may access a social graph of explicit and/or implicit connections to determine possible associations between two users. The proximity of a first user to a second user in the social graph (as determined by the number of hops between the users), as well as the security-related data maintained by the system, may be considered when assessing user behavior. For example, a chain can be configured to ask whether a given user is connected in a social graph to a known botter. The security application can trend one or more aspects of this data statistically relative to one or more known attacks to develop attack signatures that can be implemented by the plug-ins 206 for enhanced threat detection.

Security application 230 may also implement a rule set configuration system. Each chain can trigger an action, such as alert, e-mail, block, track and log. If the rule set configuration triggers a block, security application 230 inserts an entry into the user rule set database 220 recommending 'block' of an endpoint or user by references to a set of attributes, such as a specific UserID and Social Network pair, Source IP/Target IP address pair, or Source IP address. The actions are then made available to the front-end framework implemented by stub 204 and plug-ins 206, as described below.

Figure 3:
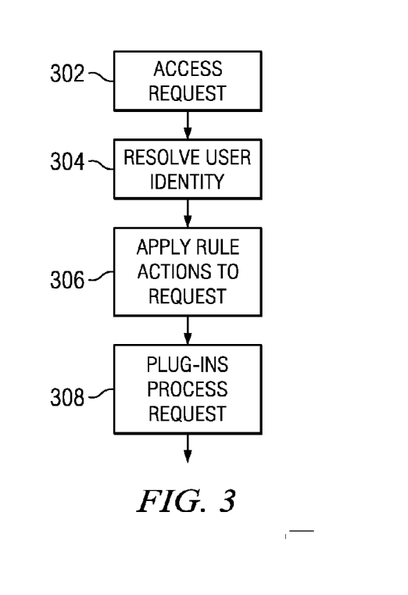
FIG. 3 is a flow chart illustrating an example process implemented by the front-end framework.
Figure 4:
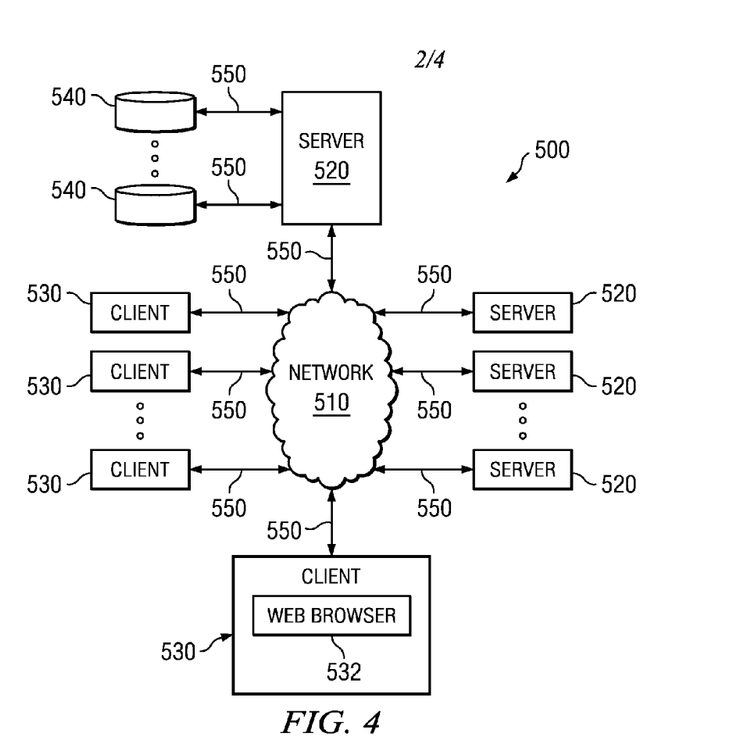
FIG. 4 illustrates an example network environment.
Figure 6:
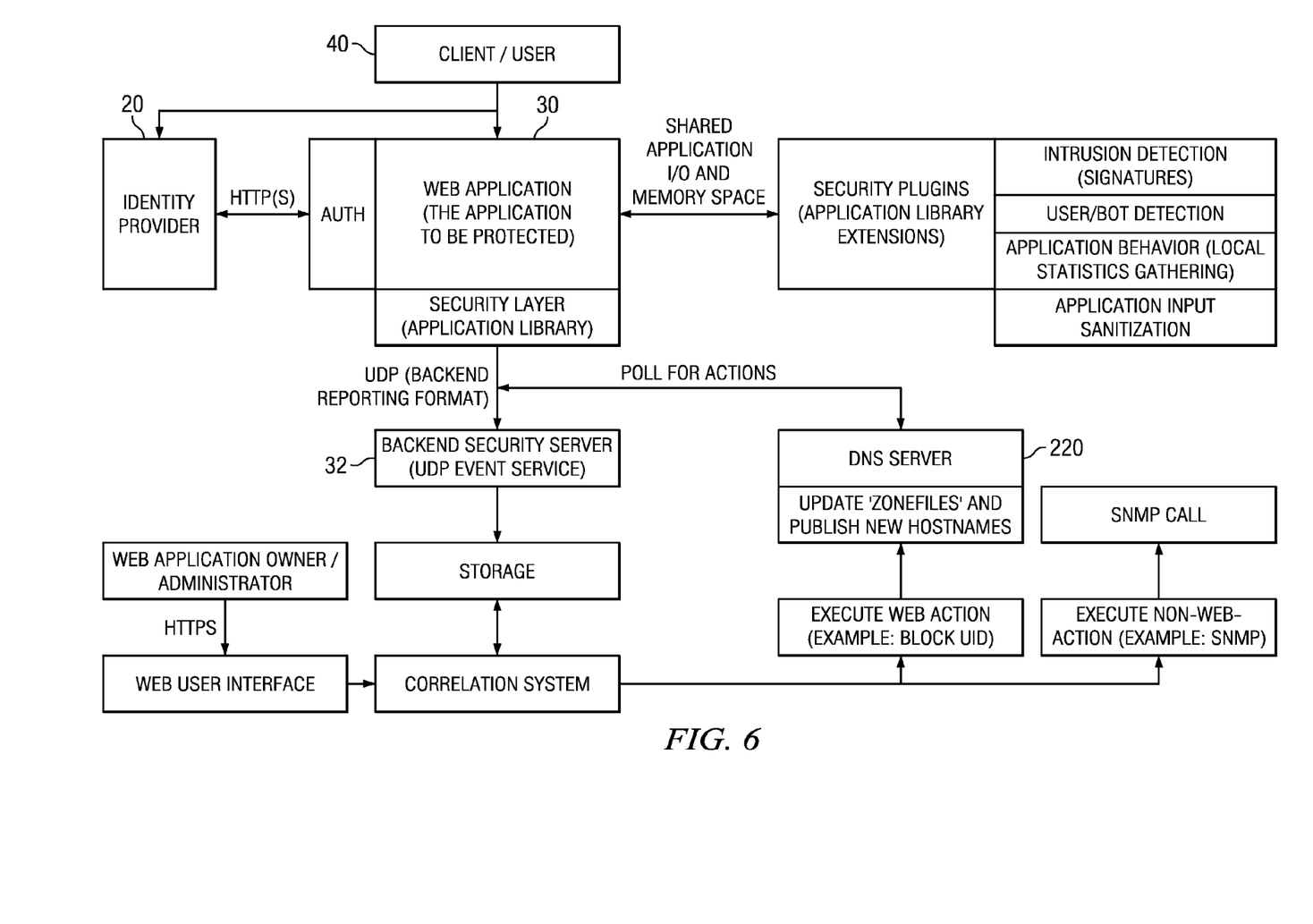
FIG. 6 is a schematic diagram illustrating an example message and data flow between various components of a security framework.

FIG. 3 illustrates a process that may be implemented by the frontend framework. With reference to FIGS. 1 and 6, a remote host 40 may access a network (web) application 30 by transmitting an HTTP GET or POST request. A browser cookie may be appended to the HTTP request. Either or both of an HTTP request header or the browser cookie may include a user identifier and a identity provider network. The HTTP Request may also include credentials either in the header or appended in a cookie. Other application layer protocols can be used. A user starts the flow by arriving at the Web Application and is requested to authenticate. He or she is then redirected to the chosen identity provider, who owns the user relationship. After authenticating with the Identity Provider, a security token is handed back to the Web Application and the session is considered authenticated. The Security Layer decodes the security token [Oauth Token, OpenID Token, FaceBook token, or similar], verifying that it is valid. The correct Social Network (Google, Facebook, Yahoo!) is determined and the UserID ('12345678', 'jane@doe.com' is set in memory). This portion is executed for every request, and is a necessity for the Security Layer to function. After the User Credentials have been verified, the Security Layer performs a DNS TXT query to update its known memory state about the user. If the query comes back empty, no additional actions (except for the plugins described below) are needed. Else, any custom action may be taken, as defined by the DNS TXT response. As discussed above, the frontend framework or security layer intercepts the HTTP request. In one implementation, a security process may access the HTTP request message stored in a buffer (302) and perform one or more operations.

In one implementation, the frontend framework may resolve the identity of the user associated with the HTTP request (304). This may involve validating the HTTP request, such as authenticating any OpenID or other credentials (as discussed above), to attribute the message to a particular user identifier and identity provider network pair. The frontend framework may also access the user rule set database 220 using various attributes associated with the user. The rule set database 220 may be implemented using the Domain Name System protocol. Other protocols can be used. For example, the frontend framework may query rule set database 220 transmitting a DNS request and using the following example format: SOCIAL_NETWORK.USER_ID.METHOD.APPLICATION_ID.DOMAIN.COM, where:

SOCIAL_NETWORK is an integer representation of a social network or other identity provider (e.g., Google, Facebook, Yahoo, Hi5 and so on);
USER_ID is the current users ID;
METHOD is the data type to query (e.g. 'srcip' for SRC IP address, 'UID' for UserID Information);
APPLICATION_ID is a unique ID given to the Network Application; and
DOMAIN.COM is the web-site hosting the security solution. (example query for a social network user with a user identifier of 12345678): dig 1.12345678.uid.test.zynga.com, where "1" is the <identity of a social network>, 12345678 is a <user identifier>, and uid is a .<flag for lookup type—here network and user identifier pair>.test.zynga.com (test.zynga.com is the DOMAIN in this case)
(example query for source ip 127.0.0.1):
dig 127.0.0.1.srcip.test.zynga.com
The user rule set database 220 may return DNS TXT records, which the frontend framework may cache for faster access when subsequent HTTP requests are received. The response may include either "pass" or "block" indications depending on the status of the user as determined by the security application 230. The response may be formatted as follows: RESPONSE_CODE:ACTION:PAYLOAD_DATA.
Example Response:
1290f049139f930109f01:block uid
The foregoing example response informs the network application that the current user has been blocked and that any plugins should observe it. Additional elements like reconfiguration of firewall rule sets can be performed using split base64 encoded queries on multiple global TXT records. The frontend framework may apply the rule actions specified in the response (306). The response may also include other commands, such as alert, e-mail, track and log. A "track" command may cause the frontend framework to send all received messages associated with the user to security application 230. A log command may cause the frontend framework to selectively forward messages associated with the user to security application 230 when one or more conditions are met. If the DNS lookup fails, the front end framework may apply a default set of operations. In addition, as FIG. 3 illustrates, the plug-ins 206 may also process the message to perform various threat detection tasks, such as identifying bots, SQL injection and other attacks. Still further, some of the plug-ins 206 may operate to correlate messages or other events at the user level, while other plug-ins may operative to correlate messages or other events at the IP network address (host) level. Still further, some plug-ins 206 may be stateless, while others may maintain state information to identify attacks.

In some particular embodiments, after the user has been verified and the state (DNS TXT Records) downloaded, the memory and I/O is handed over to the Security Plug-in 206 section of the Security Layer. Each Security Plug-in 206 loops through the request ('GET', 'POST', 'COOKIE') and checks for malicious patterns or inputs. If nothing malicious is detected, the control is handed back to the main network application. Detection of a possible malicious event triggers the reporting and notification engine.

Upon a malicious event, the system creates a standard data format formatted with the following fields:
string $input["engine"]: Calling Engine (i.e. Protection_IDS)
string $input["action"]: Recommended Action (i.e. 'block')
string $input["threat"]: Threat Category (Short Description, i.e. sqlinjection)
integer $input["rating"]: Impact (Integer, 0→4)
string $input["description"]: Human Readable Description
array $input["payload"]: Array with Machine Readable Data (i.e. IP Payload)
This data structure/hash is JSON encoded, signed and optionally encrypted for then to be sent to a central correlation engine via UDP packets to the reporting and notification backend.

After receiving the events, a separate process referred to as "The Correlation Engine," which is configurable by a Web User Interface allows for multiple chains of rules to be executed on each event. As discussed above, the correlation engine can executed various scripts that implement a chain. In one implementation, a IF-THEN-ELSE like business focused language and/or statistics-focused scripts can be configured. The Correlation Engine allows the implementer of the Security Application to configure: Time Expressions (when writing an expression, the concept of reoccurrence over time can be taken into consideration); and Grouped and Timed Expressions (when writing an expression, the concept of reoccurrence over time, tied to a specific term, user or key, can be taken into consideration). The following illustrates some example statements/expressions:
"If a user has attacked a network application/enterprise more than 10 times today, execute this action . . . "
"If a user has attacked network application/enterprise more than 10 times today and he's not playing a game, please execute this action . . . "
"If a user has been determined to be a botter, is attacking network application/enterprise at 4 PM, and is not playing a game, please execute this action . . . "
"If a user has been determined to be a botter, and has four friends that are botters, please execute this action . . . "
"If all of the above statements are true, please execute this action . . . "
Actions from the Correlation Engine
Any plug-in 206 that reports to the correlation engine can take any action, including:
 Reconfigure Plug-in (example: Update firewall signature)
 Block UID/SRC IP (Adds the User ID to a blacklist, can be extended by time).

Increase, Decrease Or Reset Statistical Counter (Used for complex conditional queries with trending. Example: 1000 attacks with 3 different social networks.)

Escalate/alarm internal systems (Can send SNMP Traps to devices, e-mail) When Block UID/SRC IP is used, the Correlation Engine writes a new 'zonefile' to synchronize the polling with the network application TXT records and the security application server. For all other requests, they are served direct from the backend framework.

Particular embodiments may be implemented as hardware, software, or a combination of hardware and software. For example and without limitation, one or more computer systems may execute particular logic or software to perform one or more steps of one or more processes described or illustrated herein. One or more of the computer systems may be unitary or distributed, spanning multiple computer systems or multiple datacenters, where appropriate. The present disclosure contemplates any suitable computer system. In particular embodiments, performing one or more steps of one or more processes described or illustrated herein need not necessarily be limited to one or more particular geographic locations and need not necessarily have temporal limitations. As an example and not by way of limitation, one or more computer systems may carry out their functions in "real time," "offline," in "batch mode," otherwise, or in a suitable combination of the foregoing, where appropriate. One or more of the computer systems may carry out one or more portions of their functions at different times, at different locations, using different processing, where appropriate. Herein, reference to logic may encompass software, and vice versa, where appropriate. Reference to software may encompass one or more computer programs, and vice versa, where appropriate. Reference to software may encompass data, instructions, or both, and vice versa, where appropriate. Similarly, reference to data may encompass instructions, and vice versa, where appropriate.

Figure 5:
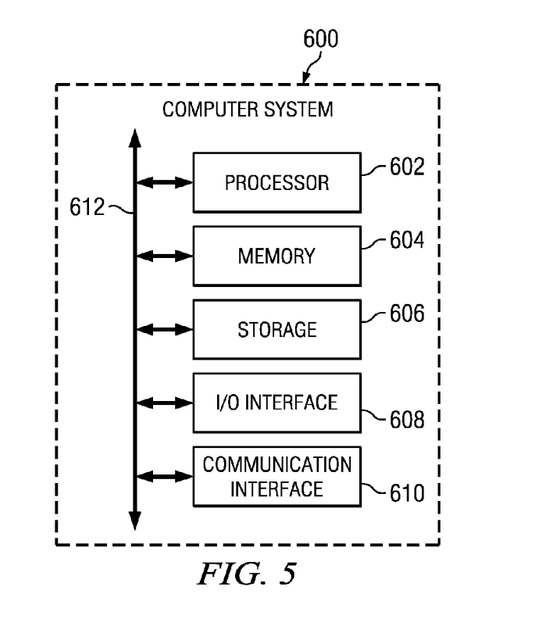
FIG. 5 illustrates an example computer system.

Particular embodiments may be implemented in a network environment. FIG. 5 illustrates an example network environment 500 suitable for providing software validation as a service. Network environment 500 includes a network 510 coupling one or more servers 520 and one or more clients 530 to each other. In particular embodiments, network 510 is an intranet, an extranet, a virtual private network (VPN), a local area network (LAN), a wireless LAN (WLAN), a wide area network (WAN), a metropolitan area network (MAN), a portion of the Internet, or another network 510 or a combination of two or more such networks 510. The present disclosure contemplates any suitable network 510.

One or more links 550 couple a server 520 or a client 530 to network 510. In particular embodiments, one or more links 550 each includes one or more wireline, wireless, or optical links 550. In particular embodiments, one or more links 550 each includes an intranet, an extranet, a VPN, a LAN, a WLAN, a WAN, a MAN, a portion of the Internet, or another link 550 or a combination of two or more such links 550. The present disclosure contemplates any suitable links 550 coupling servers 520 and clients 530 to network 510.

In particular embodiments, each server 520 may be a unitary server or may be a distributed server spanning multiple computers or multiple datacenters. Servers 520 may be of various types, such as, for example and without limitation, web server, news server, mail server, message server, advertising server, file server, application server, exchange server, database server, or proxy server. In particular embodiments, each server 520 may include hardware, software, or embedded logic components or a combination of two or more such components for carrying out the appropriate functionalities implemented or supported by server 520. For example, a web server is generally capable of hosting websites containing web pages or particular elements of web pages. More specifically, a web server may host HTML files or other file types, or may dynamically create or constitute files upon a request, and communicate them to clients 530 in response to HTTP or other requests from clients 530. A mail server is generally capable of providing electronic mail services to various clients 530. A database server is generally capable of providing an interface for managing data stored in one or more data stores.

In particular embodiments, one or more data storages 540 may be communicatively linked to one or more severs 520 via one or more links 550. In particular embodiments, data storages 540 may be used to store various types of information. In particular embodiments, the information stored in data storages 540 may be organized according to specific data structures. In particular embodiment, each data storage 540 may be a relational database. Particular embodiments may provide interfaces that enable servers 520 or clients 530 to manage, e.g., retrieve, modify, add, or delete, the information stored in data storage 540.

In particular embodiments, each client 530 may be an electronic device including hardware, software, or embedded logic components or a combination of two or more such components and capable of carrying out the appropriate functionalities implemented or supported by client 530. For example and without limitation, a client 530 may be a desktop computer system, a notebook computer system, a netbook computer system, a handheld electronic device, or a mobile telephone. The present disclosure contemplates any suitable clients 530. A client 530 may enable a network user at client 530 to access network 530. A client 530 may enable its user to communicate with other users at other clients 530.

In particular embodiments, each client 530 may be a computing device, such as a desktop computer or a work station, or a mobile device, such as a notebook computer, a network computer, or a smart telephone. Each client 530 has network capabilities.

In particular embodiments, a client 530 may have a web browser 532, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client 530 may enter a Uniform Resource Locator (URL) or other address directing the web browser 532 to a server 520, and the web browser 532 may generate a Hyper Text Transfer Protocol (HTTP) request and communicate the HTTP request to server 520. Server 520 may accept the HTTP request and communicate to client 530 one or more Hyper Text Markup Language (HTML) files responsive to the HTTP request. Client 530 may render a web page based on the HTML files from server 520 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Web browser 532 may be adapted for the type of client 530 it resides. For example, a web browser residing on a desktop computer may differ (e.g., in functionalities) from a web browser residing on a mobile device. A user of a social networking system may access the website via web browser 532.

Particular embodiments may be implemented on one or more computer systems. FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. The present disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. The present disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include an HDD, a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 602 (such as, for example, one or more internal registers or caches), one or more portions of memory 604, one or more portions of storage 606, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

The present disclosure encompasses all changes, substitutions, variations, alterations, and modifications to the example embodiments herein that a person having ordinary skill in the art would comprehend. For example, while the embodiment described above operate in connection with Oauth and OpenID, other embodiments of the invention can operate with other identity provider or open authentication protocols, such as proprietary versions of OAuth, as well as OpenID. In other words, implementations of the invention are capable of plugging into a variety of identity provider systems based on shared or open standards and de-centralized user authentication ("global unique user ids"). Similarly, where appropriate, the appended claims encompass all changes, substitutions, variations, alterations, and modifications to the example embodiments herein that a person having ordinary skill in the art would comprehend.

What is claimed is:

1. An apparatus, comprising:
a network interface;
a memory;
one or more processors; and
computer program code for execution by the one or more processors and stored in a non-transitory, computer-readable medium, the computer program code comprising:
a network application module comprising instructions operative, when executed, to cause the one or more processors to deliver network application services to one or more users, the one or more users each identified by a user identifier corresponding to a social network;
a user authentication module comprising instructions operative, when executed, to cause the one or more processors to authenticate users of the social network; and
a security layer module operative to monitor messages transmitted between remote hosts associated with the one or more users and the network application module and transmit security-related event data to a host executing a security application, wherein the security layer comprises a memory-I/O handler operative to intercept input and output of the network application module.

2. The apparatus of claim 1 wherein the security layer comprises a plug-in manager operative to copy and poll traffic of the network application module using one or more security plug-in modules.

3. The apparatus of claim 2 wherein the plug-in manager is further operative to allow: real time modification of memory input or output data of the network application module through the memory-I/O handler.

4. The apparatus of claim 2 wherein the security layer comprises a backend reporting module operative to transmit security-related event data created by the one or more security plug-in modules to a host executing a security application.

5. The apparatus of claim 4 wherein the backend reporting module is operative to encode and digitally sign the security-related event data.

6. The apparatus of claim 4 wherein the backend reporting module is operative to encrypt the security-related event data.

7. The apparatus of claim 1 wherein the security layer comprises a backend observation module operative to synchronize security configuration data for one or more of a user and an IP address with a security database.

8. The apparatus of claim 1 wherein the user authentication module is operative to authenticate a user by interacting with an identity provider system using an open authentication protocol.

9. An apparatus, comprising:
a network interface;
a memory;
one or more processors; and
computer program code for execution by the one or more processors and stored in a non-transitory, computer-readable medium, the computer program code comprising:
a network application module comprising instructions operative, when executed, to cause the one or more processors to deliver network application services to one or more users, the one or more users each identified by a user identifier corresponding to a social network;
a user authentication module comprising instructions operative, when executed, to cause the one or more processors to authenticate users of the social network;
a security layer module operative to monitor messages transmitted between remote hosts associated with the one or more users and the network application module and transmit security-related event data to a host executing a security application, and
a security application operative to correlate security related event data of a first user with security related event data of a second user based on connections between the first user and the second user in a social graph.

10. A method comprising:
delivering network application services to one or more users, the one or more users each identified by a user identifier corresponding to a social network;
authenticating users of the social network;
monitoring messages transmitted between remote hosts associated with the one or more users and the network application module; and
transmitting security-related event data to a host executing a security application, further comprising intercepting, at a memory-I/O handler, input and output of the network application module.

11. The method of claim 10 further comprising copying and polling, using a plug-in manager, traffic of the network application module in connection with one or more security plug-in modules.

12. The method of claim 11 wherein the plug-in manager is further operative to allow real time modification of memory input or output data of the network application module through the memory-I/O handler.

13. The method of claim 11 further comprising transmitting, using a backend reporting module, security-related event data created by the one or more security plug-in modules to a host executing a security application.

14. The method of claim 13 wherein the backend reporting module is operative to encode and digitally sign the security-related event data.

15. The method of claim 13 wherein the backend reporting module is operative to encrypt the security-related event data.

16. The method of claim 10 further comprising synchronizing, using a backend observation module, security configuration data for one or more of a user and an IP address with a security database.

17. The method of claim 10 wherein the user authentication module is operative to authenticate a user by interacting with an identity provider system using an open authentication protocol.

* * * * *